(12) United States Patent
Sviberg

(10) Patent No.: US 9,688,121 B2
(45) Date of Patent: Jun. 27, 2017

(54) REAR WINDOW MODULE AND CONVERTIBLE VEHICLE HAVING A REAR WINDOW MODULE

(71) Applicant: Webasto-Edscha Cabrio GmbH, Stockdorf (DE)

(72) Inventor: Magnus Sviberg, Stockdorf (DE)

(73) Assignee: WEBASTO-EDSCHA CABRIO GMBH, Stockdorf (DE)

(*) Notice: Subject to any disclaimer, the term of this patent is extended or adjusted under 35 U.S.C. 154(b) by 0 days.

(21) Appl. No.: 14/996,797

(22) Filed: Jan. 15, 2016

(65) Prior Publication Data

US 2016/0207378 A1     Jul. 21, 2016

(30) Foreign Application Priority Data

Jan. 21, 2015   (DE) ........................ 10 2015 100 840

(51) Int. Cl.
   *B60J 1/18*    (2006.01)
   *B60J 10/75*   (2016.01)

(52) U.S. Cl.
   CPC ............... *B60J 1/183* (2013.01); *B60J 10/75* (2016.02)

(58) Field of Classification Search
   CPC ............ B60J 1/183; B60J 10/74; B60J 10/75
   USPC ....................................... 296/107.07, 107.08
   See application file for complete search history.

(56) References Cited

U.S. PATENT DOCUMENTS

| | | | | |
|---|---|---|---|---|
| 2,785,922 A * | 3/1957 | Chika | ...................... | B60J 1/183 296/107.07 |
| 2,836,457 A * | 5/1958 | Berman | ................. | B60J 1/1823 296/107.07 |
| 3,021,174 A * | 2/1962 | Rund | ...................... | B60J 7/026 296/107.08 |
| 4,543,747 A * | 10/1985 | Kaltz | ..................... | B60J 1/1823 296/146.14 |
| 4,968,089 A * | 11/1990 | Murai | ..................... | B60J 7/047 296/124 |
| 6,073,988 A * | 6/2000 | Huber | ..................... | B60J 7/026 296/107.07 |
| 6,419,308 B1 * | 7/2002 | Corder | ................... | B60J 7/0084 296/107.08 |
| 6,474,731 B2 * | 11/2002 | De Gaillard | ........... | B60J 1/1823 296/146.14 |
| 6,560,930 B2 | 5/2003 | De Gaillard | | |
| 6,560,932 B2 * | 5/2003 | Heroux | ................. | E06B 7/2316 49/467 |
| 6,582,009 B2 * | 6/2003 | Wezyk | ..................... | B60J 1/183 296/107.07 |

(Continued)

FOREIGN PATENT DOCUMENTS

DE    197 37 057 A1    3/1999
DE    102 27 891 A1    1/2004

(Continued)

*Primary Examiner* — Gregory Blankenship
(74) *Attorney, Agent, or Firm* — Fitch, Even, Tabin & Flannery LLP

(57) ABSTRACT

A rear window module of a vehicle having a window body, which can be advanced in guide rails that are fixed relative to the vehicle, between a lifted closed position and a lowered open position. The window body, in relation to a vertical longitudinal center plane, at each of its two lateral edges, is provided with a sliding element, which is guided in the relevant guide rail and is fixed to the window body, being spaced apart from a lower window edge.

10 Claims, 5 Drawing Sheets

(56) References Cited

U.S. PATENT DOCUMENTS

| | | | | |
|---|---|---|---|---|
| 6,669,201 | B1 * | 12/2003 | Guillez | B60J 7/047 296/216.04 |
| 6,672,658 | B2 * | 1/2004 | De Gaillard | B60J 7/04 296/220.01 |
| 6,691,464 | B2 * | 2/2004 | Nestell | B60J 1/1861 49/374 |
| 6,827,392 | B2 * | 12/2004 | Doncov | B60J 1/183 296/107.2 |
| 6,837,535 | B2 * | 1/2005 | Plesternings | B60J 7/143 296/107.17 |
| 7,017,972 | B2 * | 3/2006 | Rudolph | B60J 7/041 296/107.16 |
| 7,832,784 | B2 * | 11/2010 | Cimatti | B60J 1/183 296/107.09 |
| 9,090,149 | B1 * | 7/2015 | Binfet | B60J 7/061 |

FOREIGN PATENT DOCUMENTS

| | | |
|---|---|---|
| DE | 10 2005 041 023 A1 | 3/2007 |
| EP | 1 284 879 B1 | 2/2003 |
| WO | 2007-096061 A1 | 8/2007 |

\* cited by examiner

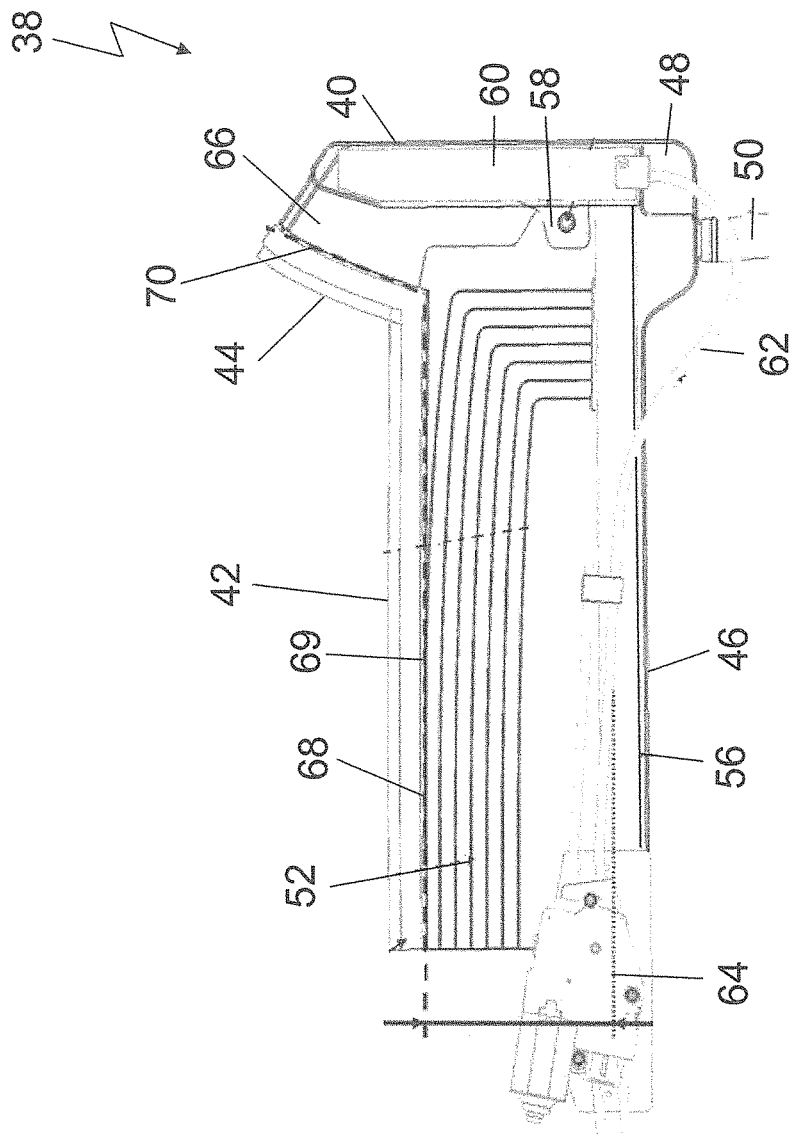

REAR WINDOW MODULE AND CONVERTIBLE VEHICLE HAVING A REAR WINDOW MODULE

CROSS-REFERENCE TO RELATED APPLICATIONS

This application claims priority from German Patent Application Number DE 10 2015 100 840.8, filed Jan. 21, 2015, which is hereby incorporated herein by reference in its entirety for all purposes.

FIELD

The invention relates to a rear window module of a vehicle and to a convertible vehicle having such a rear window module.

BACKGROUND

Convertible vehicle having rear window modules are known from practice. Rear window modules comprise a window body, which can be advanced in guide rails that are fixed relative to the vehicle, in the manner of a lifting window, between a lifted closed position and a lowered open position. The window body, in known rear window modules, includes bearing bodies at its lower edge and is guided in the guide rails via said bearing bodies. Owing to the limited installation space in vehicles, there is the problem that a sealing unit, which extends in the transverse direction of the vehicle and abuts against the window body, is arranged, in the lifted closed position, at the lower edge or directly adjacent to the lower edge of the window body. This may lead to sealing problems.

SUMMARY

It is the object of the invention to create a rear window module being realized so as to be optimized regarding the installation space requirement and its compactness.

In accordance with the invention, this object is attained by the rear window module having the features of claim 1.

In the rear window module according to the invention, no bearing devices are required at the lower edge of the window body owing to the lateral arrangement of the sliding elements. Because of this, the module, in the advancing direction of the window body, may have dimensions that are substantially solely predetermined by the length of the window body in this direction. Consequently, there are lower requirements regarding the installation space that is required for the rear window module according to the invention in the relevant vehicle as against the previously described state of the art. This results in increased flexibilities for vehicle producers regarding the creative design of the vehicle.

In a preferred embodiment of the rear window module according to the invention, a window cut-out is provided, which is limited by a module pillar on both sides, the respective guide rail being arranged at said pillar, wherein the sliding elements, which are guided in the guide rails, in the closed position of the window body, are arranged in the pillars, above a sealing unit that extends in the transverse direction and abuts against the window body. By way of this design, the sliding elements, in the closed position of the window body, may be arranged at a higher point than the sealing unit that extends in the transverse direction. The sealing hence may also abut against the window body that has been advanced into the closed position with a distance from the lower edge of the window body that guarantees a high sealing effect, without this taking away from the installation space that is required for the rear window module.

In order to guarantee that a vehicle interior, in the closed position of the window body, is also reliably sealed as against the vehicle environment, the sealing unit, in relation to the vertical longitudinal center plane of the rear window module, in a preferred embodiment, includes a sealing portion on both sides, which is set as against a transverse portion of the sealing unit and follows the window cut-out. This means that the sealing unit, in this embodiment, includes a sealing portion which is preferably straight and runs horizontally, and which merges, on both sides in the region of the respective module pillar, into a sealing portion that runs at right angles or also at a slant to the top.

In order to be able to distinguish the rear window module according to the invention as against adjacent vehicle portions, the guide rails, in an advantageous embodiment of the rear window module according to the invention, are integrated into a rear window compartment, which accommodates the window body in its open position. This means that the rear window compartment forms a pocket, into which the window body can be pulled in or from which it can be moved out. The rear window compartment may also define the window cut-out.

The rear window compartment, which constitutes a housing of the rear window module, preferably forms a lower edge of the window cut-out, in whose region the sealing unit may also be arranged, wherein a bottom of the rear window compartment has a distance from the lower edge of the window cut-out that roughly corresponds to the length of the window body in its advancing direction. This means that the rear window compartment has an installation height corresponding to the length of the window body in the advancing direction.

In order to be able to discharge any water that might enter the rear window compartment, the rear window compartment, in a special embodiment, includes one collecting tray at the very least, a water drain adjoining the same.

For driving the rear window body, each of the sliding elements, which are guided in the guide rails, may be driven via an incompressible drive cable. The incompressible drive cables may in each instance be a gradient cable, a toothed belt or the like. Each of the sliding elements may include several sliding blocks, which are guided in guide tracks of the respective guide rails.

In order to be able to embody the drive of the sliders being arranged on both sides in a synchronous fashion, it is advantageous if the drive cables are driven by a common drive motor. This means that the drive of the window body may be embodied in the manner of a drive for a retractable roof.

Subject-matter of the invention is also a convertible vehicle comprising a top, which is displaceable between a closed-top position for spanning a vehicle interior and a storage position for clearing the vehicle interior to the top, and a rear window module of the previously described type.

The convertible vehicle, in a preferred embodiment, which may be embodied with a rollover protection system, includes a car body pillar on each of its two sides, which laterally limits the rear window module. Each of the car body pillars may accommodate one of the module pillars of the rear window module or be adjacent to said module pillars.

Further advantages and advantageous configurations of the subject-matter of the invention can be taken from the description, from the drawing and from the claims.

BRIEF DESCRIPTION OF THE DRAWINGS

In the drawing, an exemplary embodiment of a convertible vehicle having a rear window module according to the invention is illustrated in a schematically simplified way and is explained in more detail in the following description. In the figures:

FIG. 5 shows a view corresponding to FIG. 4, but in a lowered open position of the window body.

DETAILED DESCRIPTION

Figure 1:
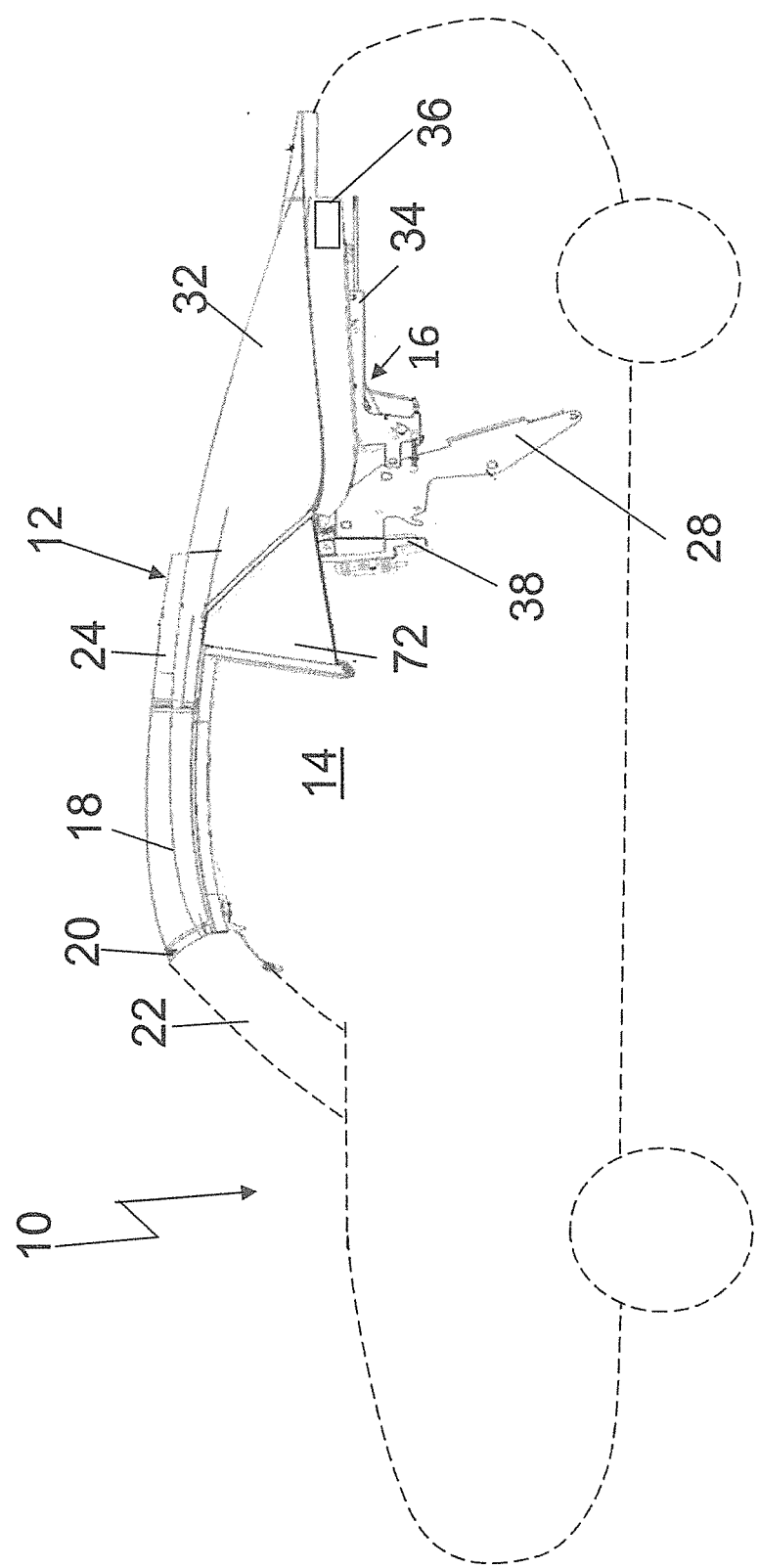
FIG. 1 shows a side view of a convertible vehicle according to the invention, having a top in the closed-top position and having a rear window module.
Figure 2:
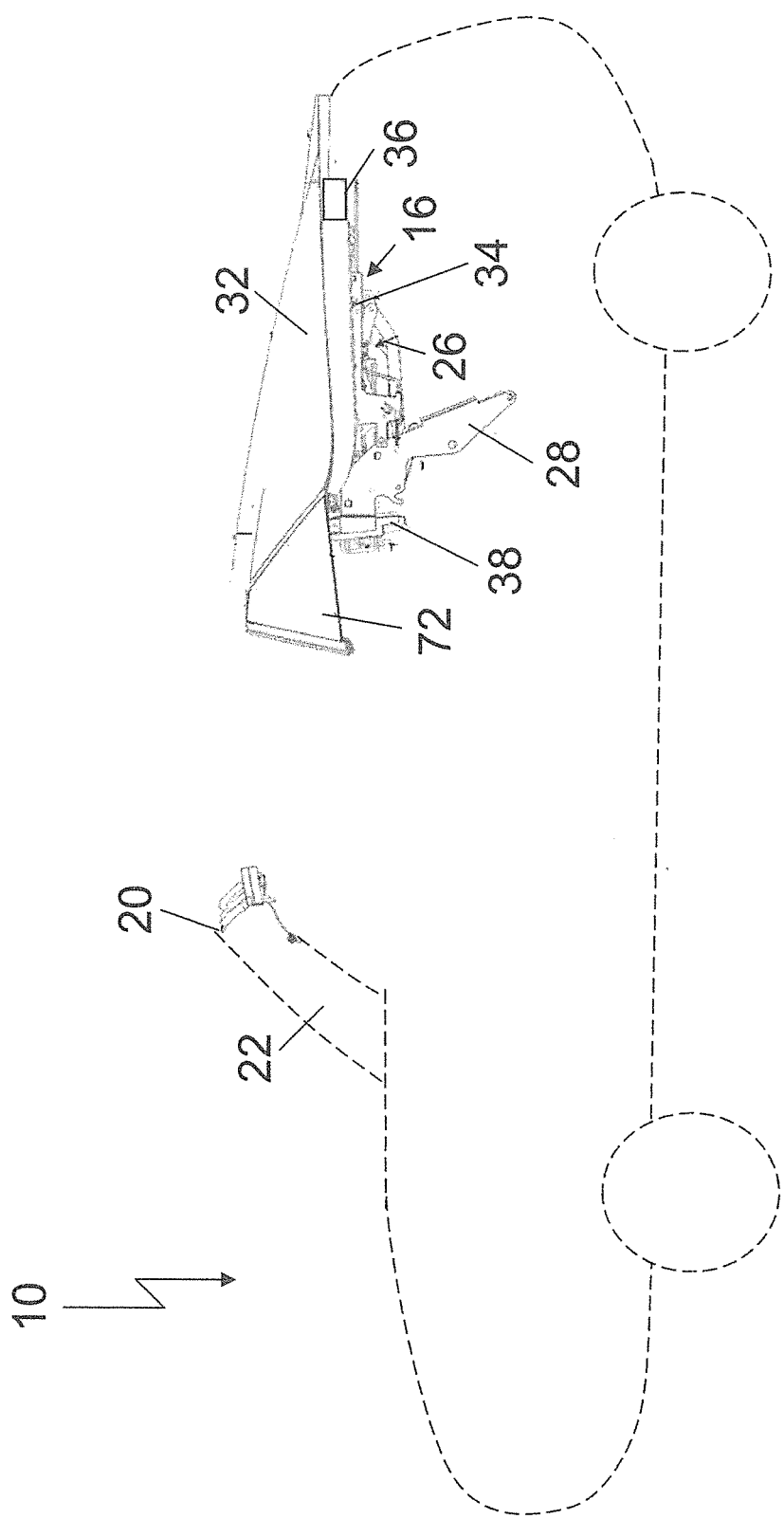
FIG. 2 shows a side view of the vehicle according to FIG. 1 in the storage position of the top.
Figure 3:
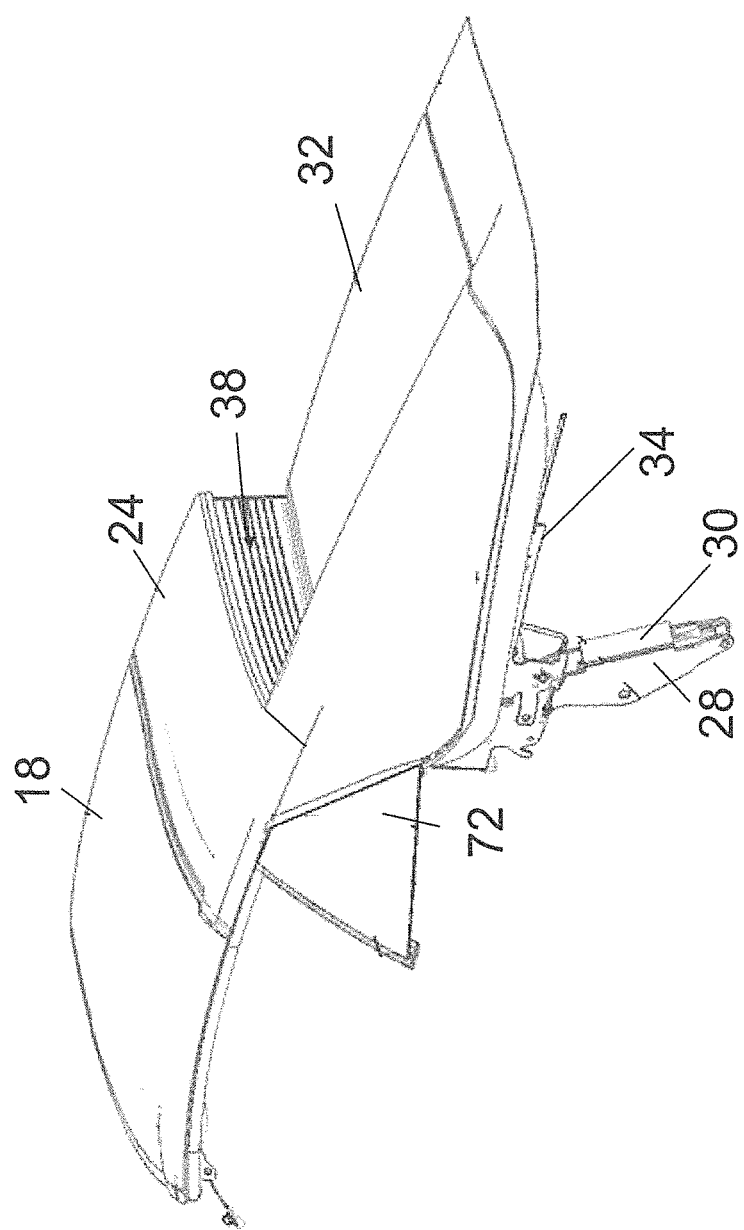
FIG. 3 shows a perspective rear view of the top, of a top storage space lid and of the rear window module.

In FIGS. 1 to 3, a convertible vehicle 10 is illustrated, being provided with a displaceable top 12, which can be displaced between a closed-top position for spanning a vehicle interior 14 and a storage position for clearing the vehicle interior 14 to the top and for being arranged in a top storage space 16. The vehicle is realized as a midship car.

In the closed-top position of the top 12, being illustrated in FIGS. 1 and 3, a front edge of a front rigid roof shell 18, via a fastener not being illustrated in more detail here, is secured to an upper frame piece 20 of a frame of a windshield 22 of the convertible vehicle 10. In the rear, the front roof shell 18, in this position, is adjacent to a rear roof shell 24 that is equally rigid.

The top 12 or the two roof shells 18 and 24 can be displaced between the closed-top position being illustrated in FIG. 1 and the storage position being illustrated in FIG. 2 using a linkage 26. The linkage 26, via main links, in relation to a vertical longitudinal center plane of the vehicle on each of its two sides, is borne at a main bearing 28 so as to be pivotable. A drive unit in the form of a drive cylinder 30 is arranged in the region of each of the main bearings.

The top storage space 16, in which the top 12 is arranged in its storage position and which is arranged above an engine compartment not being illustrated in more detail, can be closed using a storage space lid 32, which can be pivoted, using a lid mechanism 34, about a pivot axis being formed by a lid hinge 36, between the closed position being illustrated in FIGS. 1 to 3 and a cleared position, in which the top 12 can be displaced between its closed-top position and its storage position.

Figure 4:
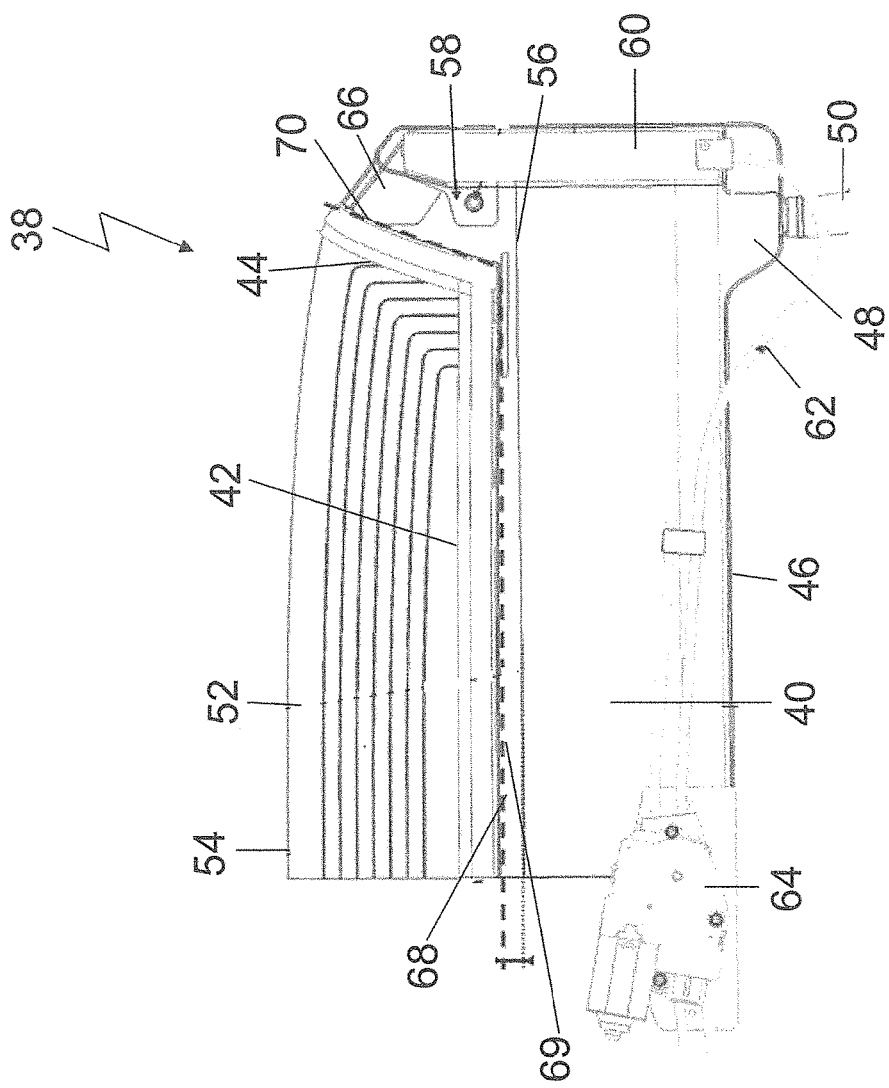
FIG. 4 shows a top view onto a right half of the rear window module in a lifted closed position of a window body.

Toward the front with respect to the top storage space 16, the convertible vehicle 10 includes a rear window module 38, which extends in the transverse direction of the vehicle and is illustrated on its own in FIGS. 4 and 5. The rear window module 38 may be linked to the main bearings 28 and may hence form, together with the top 12, the storage space lid 32 and the lid mechanism 34, a constructional unit which is illustrated in FIG. 3, and which can be inserted into a vehicle body by vehicle producers. In FIGS. 4 and 5, only a region of the rear window module 38 is illustrated, said region being arranged on the left in relation to the forward direction of travel of the vehicle 10. The region that is arranged on the right is realized, at least largely, in a mirror-symmetrical fashion, such that, for reasons of clarity, the detailed description thereof is partially omitted.

The rear window module 38 comprises a rear window compartment 40, which is illustrated in a transparent fashion for reasons of clearness, and which constitutes a housing of the module and has a slit 42 at its upper side, which limits a window cut-out 44 in the bottom and laterally. At its bottom 46 facing away from the slit 42, the rear window compartment 40, in relation to the vertical longitudinal center plane of the vehicle on both sides, has a collecting tray 48, a water drain 50 adjoining the same, via which water drain any water that might have entered the rear window compartment 40 can be discharged.

Furthermore, the rear window module 38 comprises a window body 52, which can be advanced between a closed position which is illustrated in FIG. 4, and in which the window cut-out 44 is filled, and an open position which is illustrated in FIG. 5, and in which the window cut-out 44 has been cleared. In its closed position, the window body 52, with its face-side free edge 54 is adjacent to a lower side of the rear top shell 24. In its cleared position, the window body 52 is completely accommodated by the rear window compartment 40. In this position, a lower edge 56 of the window body 52 virtually has been brought up to the bottom 46 of the rear window compartment 40.

At each of its edges that are arranged laterally in relation to the vertical longitudinal center plane of the vehicle, the window body 52 is provided with a sliding element 58, which is guided in a guide rail 60 that extends in the vertical direction of the vehicle. Each of the sliding elements 58 is connected to an incompressible drive cable 62, which is driven using a common drive motor 64. The drive motor 64 that drives the two drive cables 62 is attached to the outer side of the rear window compartment 40 in the region of the longitudinal center plane of the vehicle.

The rear window compartment 40, in each of its two lateral regions, forms a module pillar 66, with which the respective guide rail 60 engages. The module pillars 66 limit the window cut-out 44 laterally. This means that the module pillars 66 in each instance form the lateral edge of the window cut-out 44.

In order to largely prevent water and dirt from entering the rear window compartment 40, the rear window module 38 includes a sealing unit 68, which follows the slit 42 with a small distance, via which slit the window body 52 can be moved out of the rear window compartment 40 or pulled into the rear window compartment 40.

The sealing unit 68 is realized as a sealing lip and includes a middle transverse portion 69 which runs in the transverse direction of the vehicle, and which merges into a sealing portion 70, on both sides in the region of the respective module pillar 66, said sealing portion being set as against the middle transverse portion 69 and following the window cut-out 44.

The window body 52, in the advancing direction, has an extension being slightly smaller than the distance between the slit 42 and the bottom 46 of the rear window compartment 40. The sliding elements 58 are attached to the lateral edges of the window body 52, being spaced apart from the lower edge 56, i.e. they are fixed to a position of the window body 52 allowing the window body 52 to be advanced up to the bottom 46 of the rear window compartment 40. In the closed position illustrated in FIG. 4, of the window body 52, the sliding elements have been accommodated by the module pillars 66.

Each of the module pillars 66 has been accommodated by a car body pillar which is fixed relative to the vehicle, and which laterally limits the rear window module 38 and which is provided with a blind 72 on the outer vehicle side.

List of Reference Numerals 10 convertible vehicle
12 top
14 vehicle interior
16 top storage space
18 front roof shell
20 frame piece
22 windshield
24 rear roof shell
26 linkage
28 main bearing
30 drive cylinder
32 storage space lid
34 lid mechanism
36 lid hinge
38 rear window module
40 rear window compartment
42 slit
44 window cut-out
46 bottom
48 collecting tray
50 water drain
52 window body
54 edge
56 edge
58 sliding element
60 guide rail
62 drive cable
64 drive motor
66 module pillar
68 sealing unit
69 transverse portion
70 sealing portion
72 blind

The invention claimed is:

1. A rear window module of a vehicle, comprising a window body, which can be advanced in guide rails that are fixed relative to the vehicle, between a lifted closed position and a lowered open position, wherein the window body, in relation to a vertical longitudinal center plane, at each of its two lateral edges, is provided with a sliding element, which is guided in the relevant guide rail and is fixed to the window body, being spaced apart from a lower window edge,
   wherein the guide rails are integrated into a rear window compartment, which accommodates the window body in its open position,
   wherein a window cut-out is provided, which is limited both sides by a modular pillar,
   wherein the guide rails are arranged on each module pillar, and
   wherein the rear window compartment is a housing, which forms the respective module pillars.

2. The rear window module according to claim 1, wherein the sliding elements, in the closed position of the window body, are arranged in the pillars, above a sealing unit that extends in the transverse direction, and that abuts against the window body.

3. The rear window module according to claim 2, wherein the sealing unit, in relation to the vertical longitudinal plane, includes a sealing portion on both sides, which is set as against a transverse portion of the sealing unit and follows the window cut-out.

4. The rear window module according to claim 1, wherein the rear window compartment forms a lower edge of the window cut-out and has a bottom whose distance from the lower edge of the window cut-out roughly corresponds to the length of the window body in its advancing direction.

5. The, rear window module according to claim 3, wherein the rear window compartment includes at least one of a collecting tray, a water drain adjoining the same.

6. The rear window module according to claim 1, wherein each of the sliding elements is driven via an incompressible drive cable.

7. The rear window module according to claim 6, wherein the drive cables are driven by a common drive motor.

8. A convertible vehicle, comprising a top, which is displaceable between a closed-top position for spanning a vehicle interior and a storage position for clearing the vehicle interior to the top, and a rear window module according to claim 1.

9. The convertible vehicle according to claim 8, wherein the convertible vehicle, in relation to a vertical longitudinal center plane of the vehicle on each of its two sides, comprises a car body pillar, which laterally limits the rear window module.

10. The convertible vehicle according to claim 9, wherein sliding elements, in the closed position of the window body, are arranged in the module pillars, above a sealing unit that extends in a transverse direction, and that abuts against a window body, and wherein each of the car body pillars accommodates one of the module pillars.

* * * * *